United States Patent [19]

Brinkley et al.

[11] Patent Number: 4,782,881
[45] Date of Patent: Nov. 8, 1988

[54] METHOD AND APPARATUS FOR GROOVING TIRE TREAD

[75] Inventors: Max D. Brinkley, North Canton; Richard J. Greenhorn, Stow; John M. Maloney; Clifford O. Mangun, both of Akron, all of Ohio

[73] Assignee: The Goodyear Tire & Rubber Company, Akron, Ohio

[21] Appl. No.: 655,401

[22] Filed: Sep. 27, 1984

Related U.S. Application Data

[63] Continuation of Ser. No. 561,025, Dec. 13, 1983, abandoned, which is a continuation of Ser. No. 333,735, Dec. 23, 1981, abandoned, which is a continuation of Ser. No. 140,949, Apr. 16, 1980, abandoned.

[51] Int. Cl.⁴ .......................................... B29H 21/08
[52] U.S. Cl. ..................................................... 157/13
[58] Field of Search .................... 157/13; 51/DIG. 33

[56] References Cited

U.S. PATENT DOCUMENTS

4,016,020  4/1977  Ongaro ........................... 157/13 X
4,080,230  3/1978  Batchelor et al. ................ 157/13 X
4,081,017  3/1978  Appleby et al. ..................... 157/13
4,237,955 12/1980  Clayton ................................ 157/13

Primary Examiner—James G. Smith
Attorney, Agent, or Firm—T. P. Lewandowski

[57] ABSTRACT

A method and apparatus for grooving a tire tread in which a computerized numerical controller regulates the positional relationships between the tire and a hot cutting knife. The controller, through a plurality of servo motors, causes the tire to rotate in a vertical plane while effecting lateral and rotational movement of the cutter knife in each of two planes. During the cutting operation, the controller regulates the temperature of the cutting knife in accordance with the contour of the cut and the rate at which it is being made. Additionally, the computerized numerical controller is operator-programmable, providing for the generation of a program while the knife is caused to trace a tread design. The method and apparatus achieves simultaneous five-axis control of the tire grooving operation with concurrent regulation of the knife temperature.

19 Claims, 10 Drawing Sheets

METHOD AND APPARATUS FOR GROOVING TIRE TREAD

This is a continuation of application Ser. No. 561,025, filed Dec. 13, 1983, which was a continuation of application Ser. No. 333,735, filed Dec. 23, 1981, which was a continuation of Ser. NO. 140,949, filed Apr. 16, 1980, all now abandoned.

BACKGROUND OF THE INVENTION

The invention herein resides in the art of apparatus and techniques for cutting and forming tread designs in rubber-based tires. Particularly, the invention relates to such apparatus and technique for grooving or otherwise removing rubber from large off-the-road tires, thereby forming a lug or tread design. The invention automatically regulates, under programmed control, relative motions in five axes to achieve the desired grooving for the tire tread while further including means for regulating and maintaining preselected temperatures on the cutting knife during the grooving operation.

The prior art has slowly progressed in the field of tire tread forming to the point where plural axes may be controlled by a programmed cutting apparatus. Indeed, applicants find the state of the art to be best exemplified in U.S. Pat. Nos. 3,075,575; 3,589,427; 4,080,230; and 4,081,017. An analysis of the state of the art from such references illustrates an absence of sufficient control over the parameters of concern in grooving a tire to achieve cost effective and reliable grooving operations.

The prior art is devoid of any tire grooving machine which is capable of simultaneously controlling movement about five axes by means of automatic adjustment and interpolation of composite movement in each of the axes. Further, the prior art is devoid of any tire grooving apparatus wherein a turret control of the blade is maintained to affectuate cuts in the sidewall of the tire. There is no provision for the regulation of knife current to maintain a preselected temperature or to vary that temperature in accordance with the contour or depth of cut. Indeed, in the prior art, it has been virtually impossible to cut treads into tires which have been cured since the prior art did not have sufficient knife strength or current regulation to achieve such a cut. While green rubber, being of a soft pliable nature, is easy to cut, high temperatures of accurate regulation are necessary for cutting cured rubber. Further shortcomings of the prior art include limited axial rotation of the cutting knife with an inability to effect circumferential cuts. The prior art has also taught that the tire be cut in a deflated posture and, while such may result in satisfactory cutting of green rubber, a deflated tire has insufficient rigidity to withstand the forces imparted in cutting cured rubber. Yet further, the prior art has been devoid of a means for automatically programming an apparatus for cutting a desired tread design by merely tracing such design on a used or rejected tire carcass.

OBJECTS OF THE INVENTION

An object of the first aspect of the invention is to provide a method and apparatus for grooving tire treads wherein five axes of relative movement between the tire and cutting knife are simultaneously controlled.

An object of another aspect of the invention is to provide a method and apparatus for grooving tire tread wherein turret control of the cutting blade is affectuated to achieve cuts on the sidewall of the tire.

Still another object of an aspect of the invention is to provide a method and apparatus for grooving tire treads wherein the temperature of the cutting knife is controlled by current regulations with such temperature varying with the contour and depth of the cut being effected.

Still a further object of an aspect of the invention is to provide a method and apparatus for grooving tire treads whereby the tread may be formed in the tire after the rubber has cured.

Yet an additional object of an aspect of the invention is to provide a method and apparatus for grooving tire treads wherein the cutting knife may be rotated through a semi-circular arc to affectuate circumferential cuts in the tires.

Yet an additional object of an aspect of the invention is to provide a method and apparatus for grooving tire treads wherein tire lugs are formed on a mounted and inflated tire, providing rigidity to the tire during formation of the tread.

Still an additional object of an aspect of the invention is to provide a method and apparatus for grooving tire tread in which a tread design may be traced and committed to memory for subsequent tire grooving operations.

SUMMARY OF THE INVENTION

The foregoing and other objects of the invention which will become apparent as the detailed description proceeds are achieved by apparatus for cutting a tread design into a tire, comprising: first means for receiving and rotating said tire about the tire axis; a carriage in juxtaposition to said first means and movably maintained upon a first set of tracks parallel to the tire axis and a second set of tracks normal to the tire axis; and a knife maintained upon said carriage, said knife being rotatable about a pair of orthogonal axes.

Other objects of the invention are achieved by the method of forming grooves across the circumferential surface and sidewall of a tire, comprising: rotating a tire about an axis; laterally moving a carriage bearing a hot cutting knife in parallel and orthogonal directions with respect to said axis, bringing said knife into cutting engagement with said tire; and rotatably moving said knife about a pair of orthogonal axes, said lateral and rotational movement of said knife effecting a groove across the tire from the sidewall and across the tread surface thereof.

DESCRIPTION OF THE DRAWINGS

For a complete understanding of the objects techniques, and structure of the invention, reference should be had to the following detailed description and accompanying drawings wherein.

DETAILED DESCRIPTION OF THE PREFERRED EMBODIMENT

Figure 1:
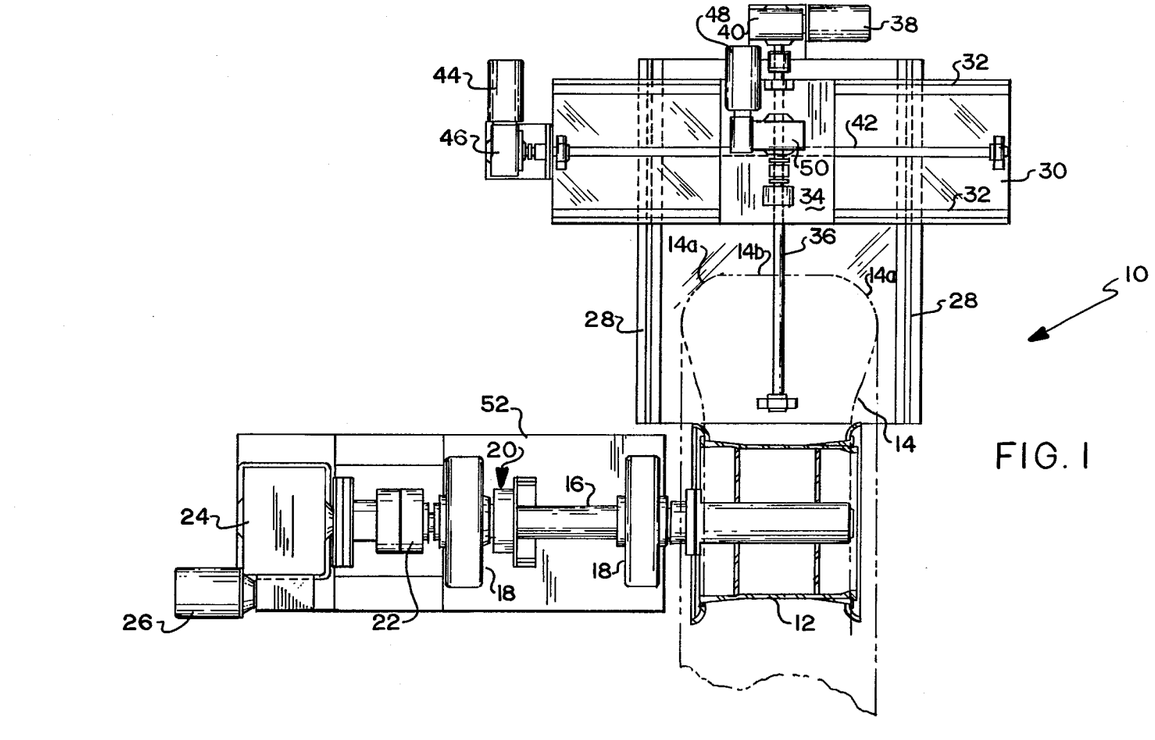
FIG. 1 is an illustrative top plan view of the tire grooving apparatus of the invention.
Figure 2:
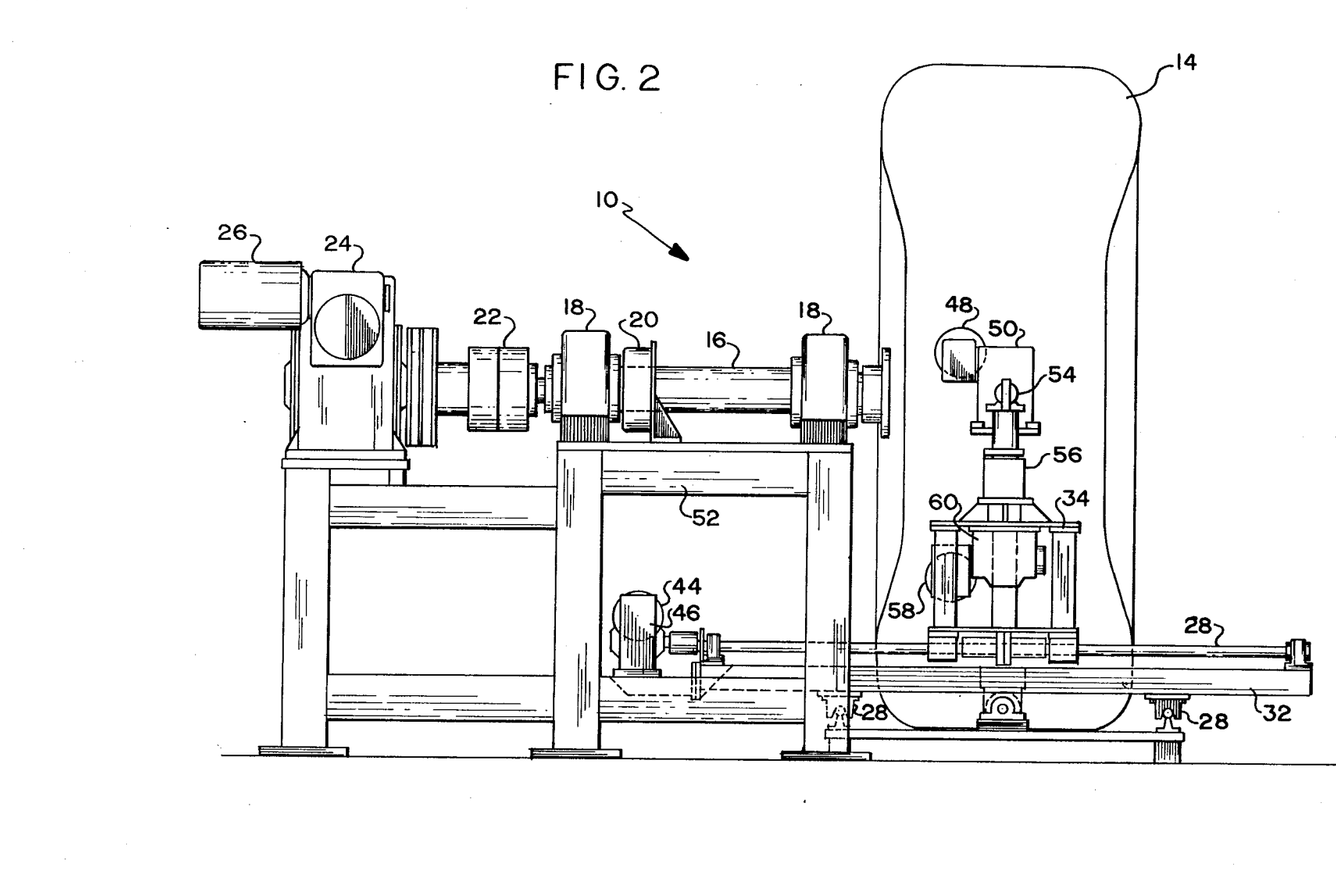
FIG. 2 is an illustrative front plan view of the structure of FIG. 1.
Figure 3:
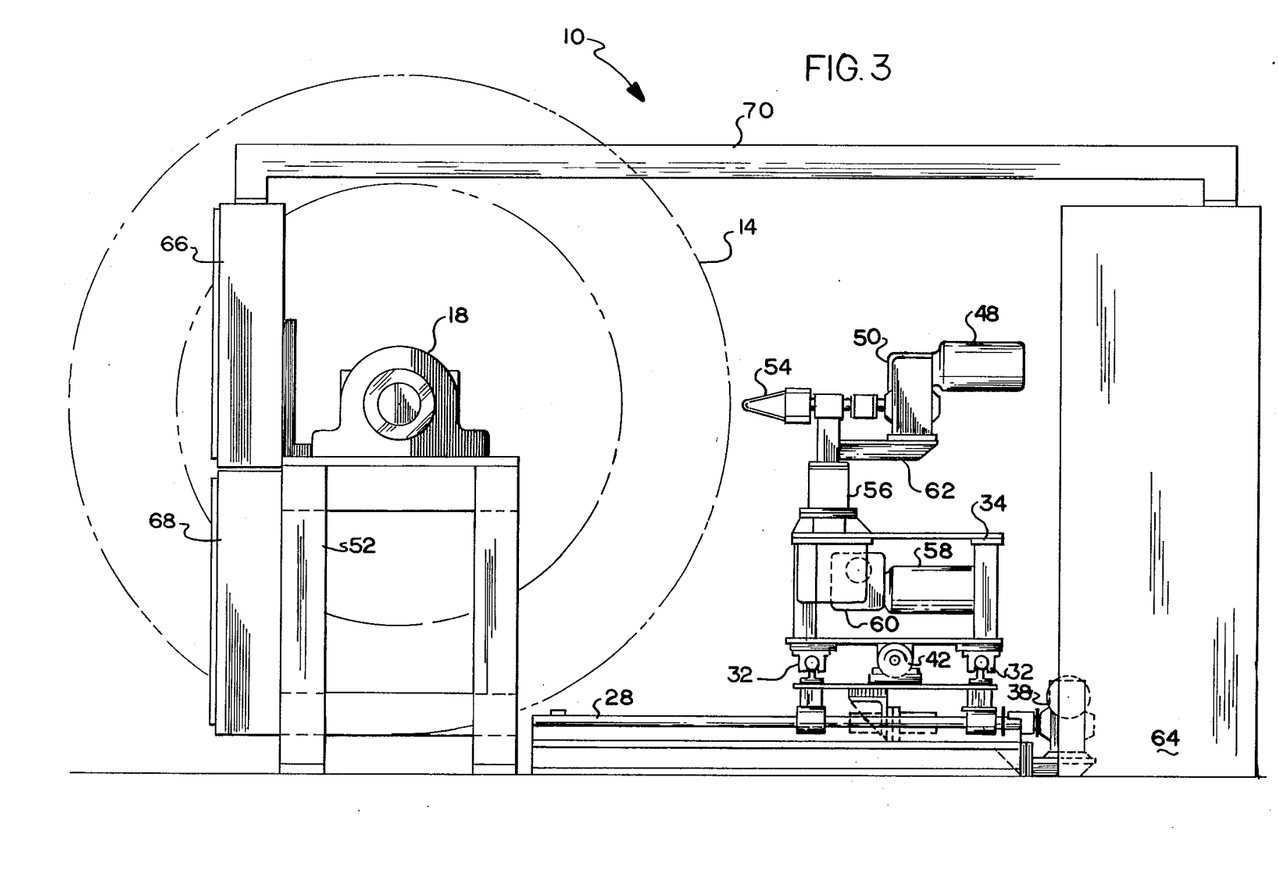
FIG. 3 is an illustrative side plan view of the structure of FIG. 1, showing interconnection with a computerized numerical controller.

Referring now to the drawings, and more particularly FIGS. 1-3, it can be seen that the tire grooving system according to the invention is designated generally by the numeral 10. In the system, a rim 12, having an inflated tire 14 mounted thereon, is rotatably connected to a shaft 16 with the center of the tire 14 and rim 12 being colinear with the rotational axis of the shaft. Bearings 18 support the shaft 16 in a customary manner, while a brake 20 is provided for impeding the rotation thereof. A coupling 22 interconnects the shaft 16 with a shaft extending from a gear box 24, this latter element being driven in standard fashion by an electric motor 26. It will be noted that the elements of 12-26 are thus operative for control of the rotation of tire 14 about a rotational axis colinear with the shaft 16.

Tracks or ways 28 are provided in orthogonal relationship to the rotational axis of the tire 14. A carriage 30, itself including tracks or ways 32, is maintained upon the tracks 28 for movement toward or away from the tire 14. The tracks or ways 32 receive a carriage 34 which maintains a cutter assembly, best shown in FIG. 3, thereupon. The carriage 34 is moveable upon the ways 32 along a rectilinear transverse path parallel to the rotational axis of the tire 14.

A ball screw 36 is operatively connected to the carriage 30 and is driven through a gear box 40 by a motor 38 to achieve movement along the tracks 28. Similarly, a ball screw 42 is operatively connected to the carriage 34 to move the carriage along the tracks 32 under control of the motor 44 through the gear box 46. As noted above, movement of the carriage 30 is orthogonal to the rotational axis of the tire 14, while movement of the carriage 34 is parallel to such rotational axis.

maintained upon the carriage 34 is a motor 48 and gear box 50. These elements, as best shown in FIGS. 2 and 3, are connected to and drive a cutter knife 54. The rotational movement achieved via the motor 48 is about a horizontal axis, allowing the knife to be rotated through an arc of 180°, the same being ±90° with respect to the vertical plane. This movement allows the sharp cutting edge of the knife to constantly maintain parallel relationship to the direction of travel of the knife across the tire 14 during the cutting movement, minimizing interference forces against the knife. Further, with the knife being rotatable through an entire arc of 180°, it is possible to make circumferential cuts about the tire. Indeed, with such knife control, virtually any tread or lug pattern can be cut, limited only to the imagination of the designer.

As shown in FIGS. 2 and 3, the tire 14 is rotated under control of the motor 26 via the assembly maintained by the frame 52. Movement of the cutter knife 54, in both parallel and orthogonal relationship to the rotation of the tire 14 is achieved via the motors 38,44. Orientation of the knife 54 with respect to the cutting movement of the knife is achieved via the motor 48.

This motor allows the cutter knife 54 to be rotated about a horizontal axis. As shown, the knife 54 has a continuous cutting edge which makes dual entry into the tread surface of the tire to effect removal of the cut piece. Preferably, the knife is constructed of hardened tool steel. Obviously, the geometrical configuration of the knife will be determined by the lug profile desired.

It is desired that the knife 54 also be rotatable about a vertical axis so that the cutter knife may engage and cut along the sidewall of the tire 14, as along the edges and shoulders 14a shown in FIG. 1. Heretofore in the art, there have been no means provided for achieving such sidewall grooving except by manual operations. To this end, a turret 56 is driven by a motor 58 through a gear box 60 to rotate the knife 54 about a vertical axis. It will be appreciated that the posture or attitude of the knife 54 may be completely regulated by means of the motors 48,58 to make normal or perpendicular contacting engagement with both the sidewall 14a and tread surface 14b of a tire for grooving the same. It will be appreciated that the dual axis movement of the knife 54 is achieved, in part, by the maintenance of the motor 48 and gear box 50 upon a support arm 62 which is mounted to and rotated with the turret 56.

As best shown in FIG. 3, the tire grooving system 10 includes a computerized numerical controller 64 for achieving regulation of movement of the motors 26,40,44,48 and 58. The numerical controller 64 is also responsible for selection of the temperature of the knife 54, that temperature being regulated in accordance with the contour of the groove being cut and as further defined by whether the tire is cured or green. In any event, the controller 64 is preferably of the type manufactured by Allen Bradley, Inc. of Highland Heights, Ohio, and manufactured under Model No. 7320. Such device includes such options as manual digitizing, peripheral inputs, mirror imagery, and servo motors and drives. This device is well known and understood in the art as being typically used for automatically controlling lathes and the like, but until applicant's invention herein, was never before used in cutting operations for forming lug patterns or tread designs on a tire. As described in "SYSTEM 7320 OPERATORS MANUAL," publication no. 7320-801, copyrighted in August, 1978, by Allen Bradley, Inc., the numerical controller 64 is capable of monioring and controlling six axes of movement. In this regard, the motors 26,38,44,48 and 58 are each servo motors which include therewith rotation encoders as are presently well known in the art. These encoders present digital output signals corresponding to the rotational movement of the motors and, accordingly, such data is indicative of the instantaneous positional relationship between the cutter knife 54 and the tire 14. With the computerized numerical controller 64 being programmable, this information is used for controlling each of the aforesaid motors and the temperature of the cutter knife 54 to achieve the desired grooving of the tire 14. As shown, control and wiring panels 66,68 are interconnected to the frame 52 for communication between the system 10 and the controller 64.

As should be apparent to those skilled in the art, the system 10 achieves concurrent control over 5 axes of movement, as well as temperature selection for the cutter knife 54. The servo motor 40 and its associated encoder are used for controlling movement along an X axis perpendicular to the rotational axis of rhe tire 14 while the servo motor 44 and its encoder control movement along a Y axis parallel to the rotational axis of the tire 14. Obviously, the X and Y axes are linear. Three rotational axes of control are also provided. Servo motor 48 and its encoder are operative for controlling movement of the knife 54 about a horizontal axis A, while the servo motor 58 and its encoder control rotational movement of the knife 54 about a vertical axis B. Finally, the servo motor 26 and its encoder control rotational movement about the rotational axis C which is colinear with the axis 16, discussed above.

For the numerical controller 64 to properly function, it must have a fixed reference point for each of the axes of control. This reference point or "home" position is established by the positioning of limit or proximity switches along the various axes. An appreciation of the establishment of home positions for the various axes, along with an understanding of the overall sysrem arrangement, can best be had with reference to FIG. 4. As shown, the computerized numerical controller 64 has associated therewith a servo motor control panel 72. This panel, readily available in the art for use with the numerical controller 64, is connected to and controls the rotational movement of the servo motors associated with the A, B, C, X and Y axes as shown. Of course, the actuation of these motors via the circuitry of the control panel 72 is under programmed control of the numerical controller 64. Data is communicated back to the controlled 64 as to the amount of rotational movement actually achieved by the various motors by means of the respective encoders 26a, 40a, 44a, 48a and 58a. Accordingly, there is a feedback loop between the controller 64, motor control panel 72, and the respective motors and their encoders such that accurate positional movement may be achieved.

Figure 4:
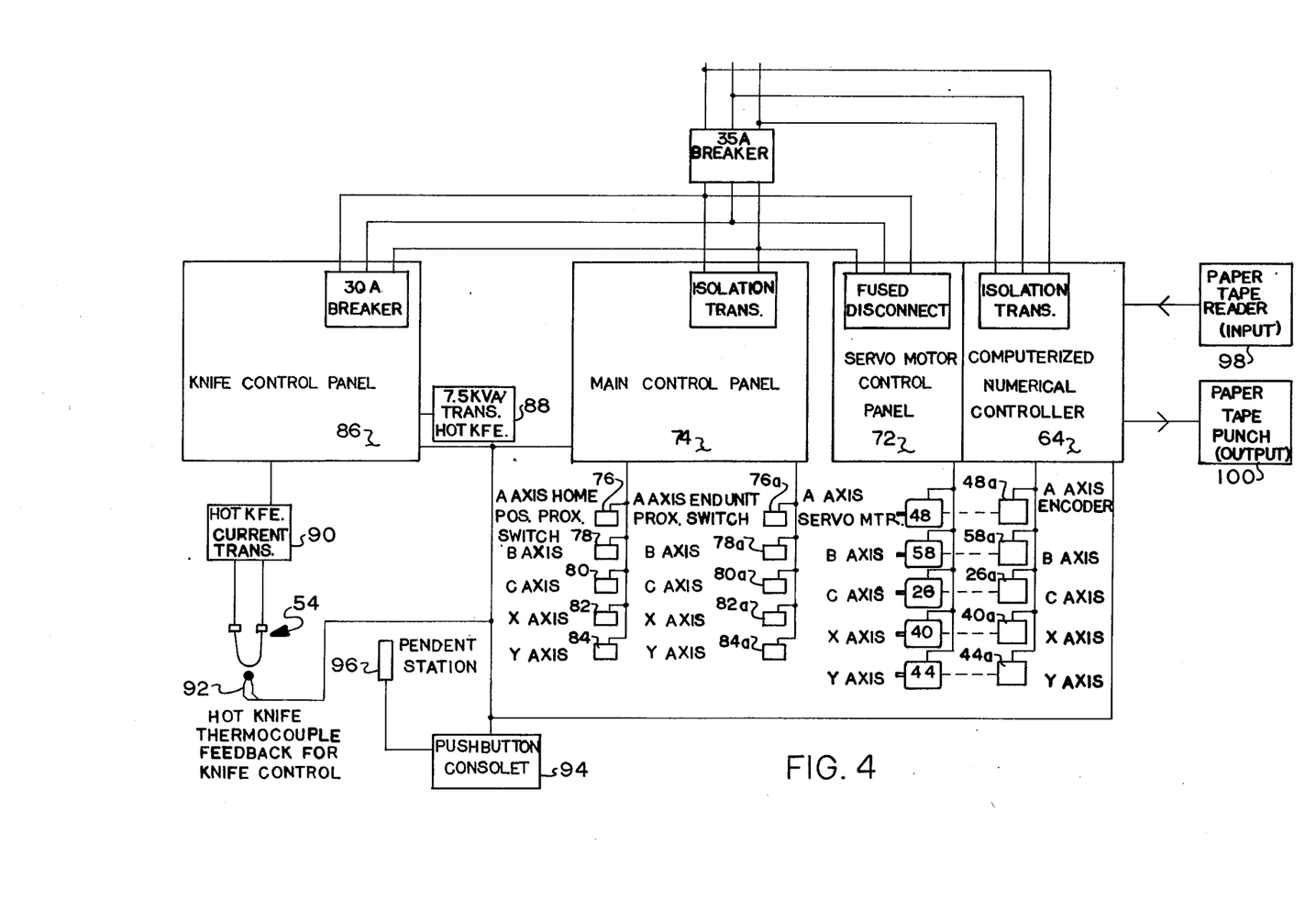
FIG. 4 is a system block diagram of the apparatus of the invention.

Data respecting the amount of movement made along a particular axis is important only when such movement is made with respect to an established home position. In this regard, the main control panel 74 is provided, as shown in FIG. 4, in interconnection with home position proximity switches 76–84. Further, to establish an end or a limit to the travel which may be achieved along each of the axes, each such axis is provided with an end limit proximity switch 76a–84a. As will be appreciated hereinafter, the numerical controller 64 is programmed in standard fashion to begin operation from a home position and, at the beginning of such a program, automatically rotates each of the five servo motors to a point where each of the five associated home position proximity switches are tripped. With the establishment of the home position, movements of the five servo motors, sensed by the controller 64 via the associated encoders, becomes meaningful with respect to the exact positional relationship between the cutter knife 54 and the tire 14 at any particular time. Further, the end limit switches define a point past which the operator cannot move along any of the five axes while still remaining within control of the unit 64.

Also included as part and parcel of the system as shown in FIG. 4 is the knife control panel 86 which includes a transformer 88 for stepping down the line voltage available to the system for operation of the temperature regulators to be discussed hereinafter. There is also provided a current transformer 90 for supplying sufficient current to the knife 54 to achieve cutting temperatures required in operation of the invention. A thermocouple 92 is attached to and made a portion of the knife 54. The thermocouple communicates to the knife control panel 86 and temperature regulating circuitry thereof the instantaneous temperature of the knife for current regulation thereto. Such temperature control will be discussed in more detail hereinafter.

As shown, the main control panel 74 communicates with the controller 64 for data respecting positioning of the cutter knife 54 with respect to the five axes of control. Further, the knife control panel 86 communicates with the controller 64 for appropriate selection of knife temperature at various points in the cutting or grooving operations. Also communicating with the numerical controller 64 is a pushbutton control panel 94 and a pendant station 96. The former comprises a plurality of push-button switches for a production mode of operation. For example, the consolet 94 may include means for energizing the knife 54 and for monitoring the temperature thereof. It would also typically include selector switches, in communication with the controller 64, to select the mode of operation of the unit as between automatic and manual, local and remote, and block/block, to be discussed with respect to programming hereinafter. The consolet 94 would also include means for starting and stopping the program cycle, for entering an emergency stop to terminate all operations, and to reset the system.

The pendant station 96 parallels much of the control inherent with the computerized numerical controller 64. As will be known to those skilled in the art, the controller 64 includes a CRT display, a keyboard, means for jogging the servo motors of the various axes, and the like. The pendant station merely sets much of this control circuitry immediately adjacent the tire 14 being operated upon such that the operator may, via the station 96, quickly communicate with the controller 64. By way of example, the pendant station 96 can include means for starting and stopping the program cycle, digitizing positional data at particular points in time to facilitate program development, homing the machine with respect to all axes, and jogging each of the various axes in each of several directions. While the controller 64 is provided with selector switches for such jogging techniques, the pendant station 96 provides "joy sticks," as readily known in the art, for achieving rapid control of the jogging techniques with the operator being present immediately adjacent the tire under consideration. For example, the X and Y axes may be controlled via one joy stick with the A and B axes being controlled by another. The C axis, relating to actual rotation of the tire 14, is controlled merely by two switches, one for clockwise and the other for counterclockwise rotation. Again, it should be recalled that the pendant station 96 includes controls inherently available with the numerical controller 64, the station 96 merely paralleling such controls to allow the operator to be closely adjacent the tire.

With final attention to FIG. 4, it will be seen that the controller 64 may also have associated therewith a paper tape reader 98 and a paper tape punch 100 to provide input and output means via such peripheral equipment. A benefit of this structure is that the program for a particular tread or lug design may be stored on a paper made for subsequent use when that lug design is desired.

Figure 5:
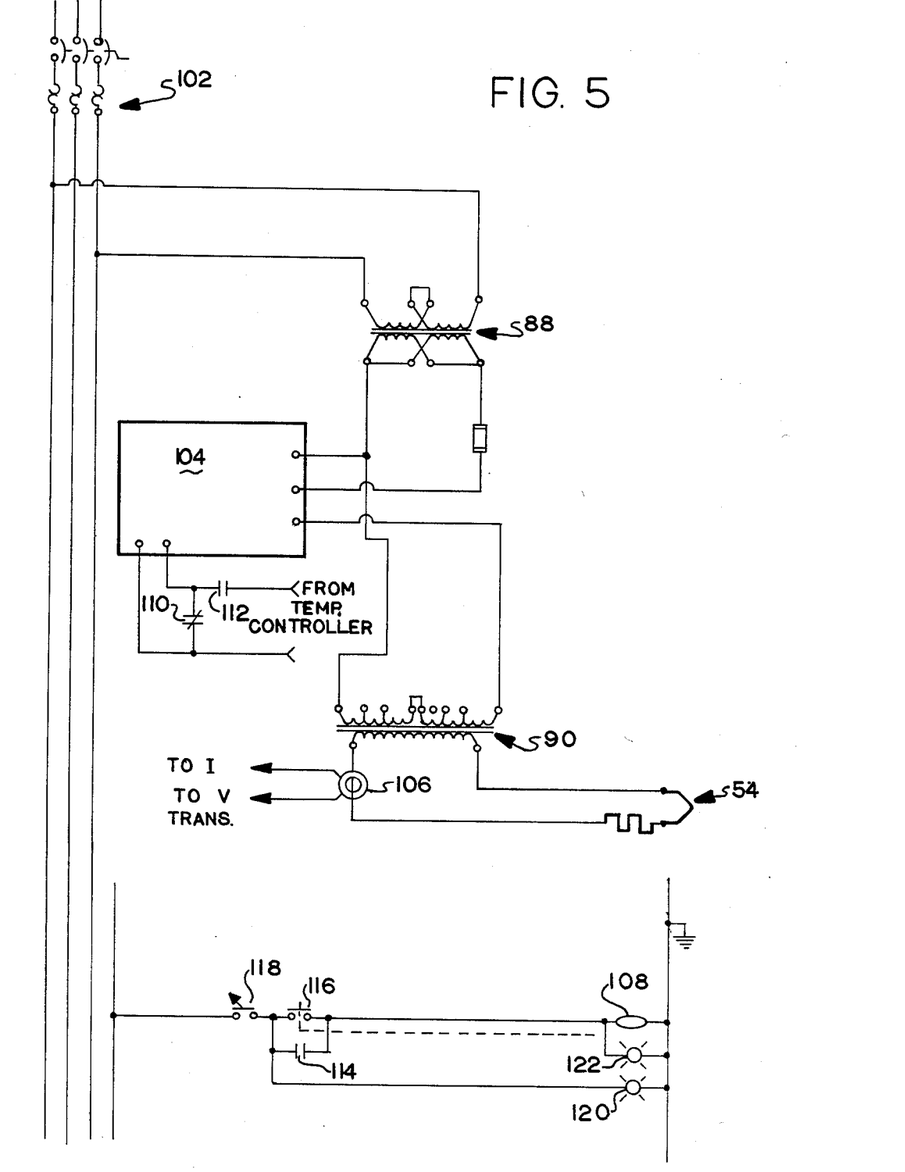
FIGS. 5 and 6 are schematic diagrams of the temperature regulation and selection circuitry of the invention.
Figure 6:
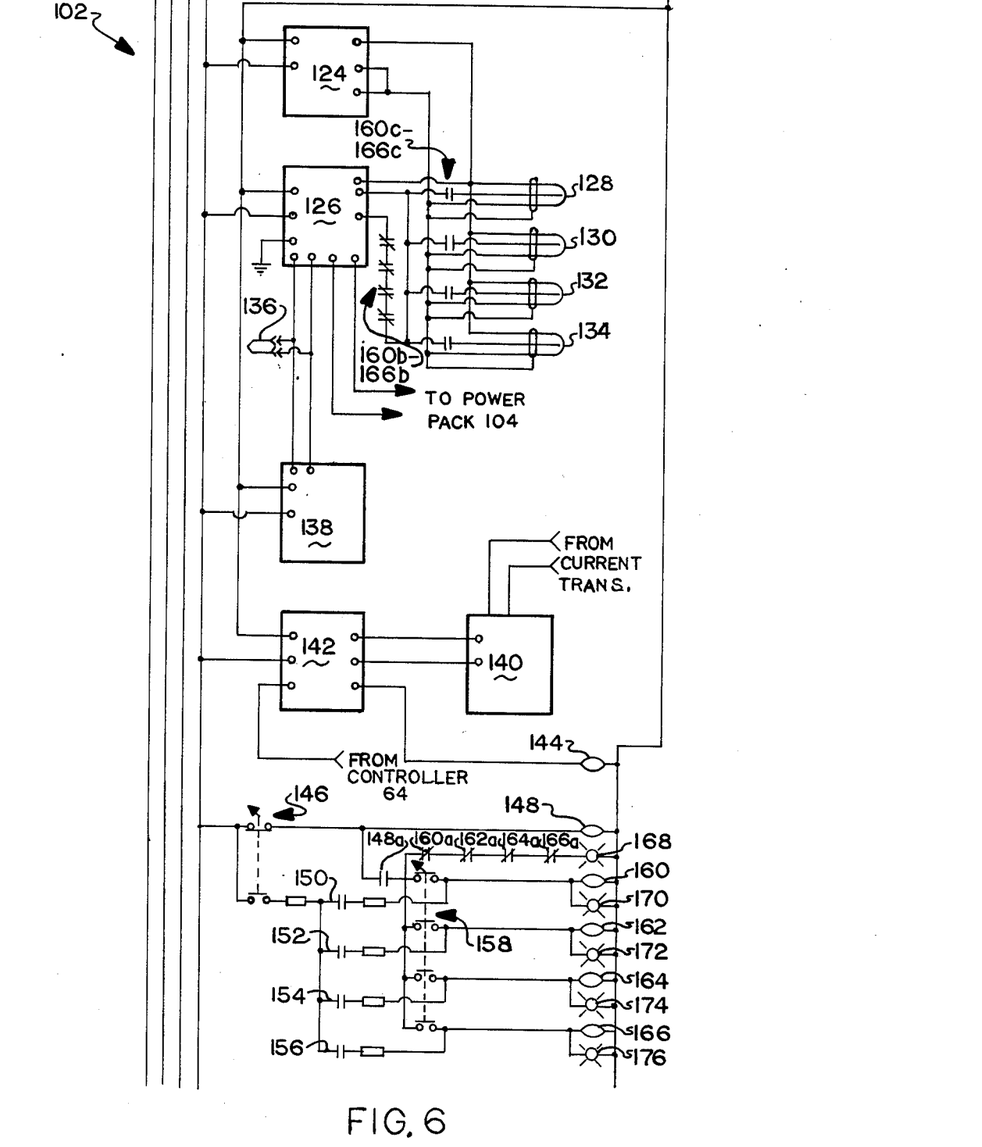

With reference now to FIGS. 5 and 6, the temperature regulation and control circuitry for the cutter knife 54 may be seen. Power lines 102 are connected to the transformer 88 for supplying power input to a power pack 104. As is well known in the art, the power pack 104 receives an input from the temperature controller 126 of FIG. 6 and presents an output voltage proportional thereto. The output voltage of the power pack 104 is applied to the transformer 90 which supplies current to the cutter knife 54. Since current and voltage are related in a transformer, the current applied to the knife 54, and the resultant temperature thereof, are directly related to and controlled by the input signal from the temperature controller 126 applied to the power pack 104. As also shown, a current transformer 106 is provided about one of the power lines to the knife 54 and presents a signal to the current-to-voltage transducer 140 of FIG. 6, to be discussed hereinafter.

As shown in FIG. 5, contacts 118 are closed by the operator to enable a current application to the knife 54. The push-button contacts 116 may then be closed by the operator to actuate the knife by energization of the relay 108. This relay opens the contacts 110 and closes the contacts 112 to enable the temperature controller 126 to communicate with the power pack 104. Similarly, the contacts 114 are closed to provide a holding circuit for the relay 108. It will also be noted that the lamp 120 is illuminated upon closure of the contacts 118 to indicate that the knife may be energized, while the lamp 122 is illuminated upon closure of the contacts 116, indicating that current is actually being applied to the knife 54.

With particular reference to FIG. 6, it will be seen that the power lines 102 are connected to a DC power supply 124 which passes appropriate DC voltages to the temperature controller 126. This latter element, as well known in the art, includes a temperature selector as part and parcel thereof along with auxiliary inputs comprising the thumb wheel resistor switches 128–134. Accordingly, the temperature controller 126 has associated therewith five selectable temperatures which may be preselected by the operator. Typically, these five temperatures would correlate with the necessary cutting temperatures as dictated by the depth of cut, the curvate nature of the cut, whether the tire is cured or uncured, and the like.

As shown, the inputs to the temperature controller 126 are through four paired relays, each including both normally open and normally closed contacts, the normally closed contacts being in series connection. The controller 64, in standard fashion, selects the closure of the various contacts, under program control, such that selection of the temperature designated by any of the temperatures of the thumb wheel switches 128–134 opens one of the normally closed contacts, removing the signal to the temperature controller 26 of the built-in selector switch. Accordingly, the temperature selected for the knife 54 is one of five predesignated temperatures, as designated by the thumb wheel switch of the temperature controller 126 itself, or by the thumb wheel switches 128–134 on the auxiliary inputs thereto. Again, it should be borne in mind that as the knife cuts a groove through the tire 14 various of the contacts on the inputs of the controller 126 will open and close, under programmed control, to alter the knife temperature to accommodate varying parameters.

It will be noted that the output of the temperature controller 126 is applied to the input of the power pack 104 to affect, through the transformer 90, proper application of current to the knife 54 to achieve the desired temperature. It will also be noted that a thermocouple 136, imbedded in the tip of the knife 54, presents an input signal to the temperature controller 126 indicative of the actual temperature of the knife within the tire. Thus, the controller 126 may vary the output applied to the power pack 104 such that the actual temperature of the knife 54 will be that selected via the thumb wheel inputs to the controller 126.

The thermocouple 136 is also connected to a temperature display unit 138, located at the pushbutton control station 94 and allowing the operator to visually monitor temperature fluctuations in the knife during the cutting operation to assist in programming the controller 64. For example, should the cutting efficiency of the knife decrease on a contoured cut, the operator may determine that the program should be altered to either change the temperature selected for the knife at that point, or change the rate of movement of the knife through the tire.

A current to voltage transformer 140 receives the output of the current transformer 106 and applies to the volt meter 142 a voltage signal corresponding to the current sensed. Accordingly, the volt meter 142 functions as a current meter, registering for the operator an indicia of the current applied to the cutter knife 54.

A relay 144 is connected to an output of the meter 142 for closure when current through the knife 54 is absent. This condition is indicative of a broken knife 54 and, closure of the relay 144 advises the controller 64, under programmed control, to terminate operations.

A switch 146 is provided at the console 94 to allow the operator to select local or remote control. The switch 146 is shown in position for selection of the local control, by which a relay 148 is energized to close the contacts 148a. This allows closure of a selected one of the four contacts of the switch 158 for selection of one of the five temperatures provided by the selector switches 128–134. With none of the contacts of the switch 158 closed, the programmed temperature inherent with the temperature controller 126 is selected. As shown, the contacts of the switch 158 each have associated therewith a particular one of the relays 160–166, each such relay including normally closed contacts 160a–166a and 160b–166b. Also included are normally opened contacts 160c–166c. It will be apparent that energization of any of the relays 160–166 will result in an output from the controller 126 corresponding to a selected temperature. With none of the relays 160–166 energized, the output of the controller 126 is dictated by the selector switch inherent therewith.

When the switch 146 is in the remote mode of operation, opposite that shown, temperature selection is under control of the numerical controller 64. In this instance, the controller 64 closes one of the relay contacts 150–156 to select an appropriate relay 160–166 for energization. As can be seen, temperature selection is substantially the same as in the local mode of operation, but relay selection is done automatically under control of the numerical controller program. In either mode of operation, lamps 168–176 are provided for indicating on a panel which of the five available temperatures have been selected for operation at any point in time.

In grooving the tire 14, either under manual local control or automatic remote control, various of the relays 160–166 are closed to select one of the five available temperatures for cutter knife operation. These selections are provided as the input to the temperature controller 166 which is applied to the power pack 104 to affect a corresponding output to the current transformer 90. There is a corresponding current applied to the cutter 54 which results in a temperature sensed by the thermocouple 136. This temperature is displayed via the display 138 and is also used by the temperature controlled 126 to adjust the output signal to maintain the temperature selected. In the design of the invention, the transformer 90 is provided for supplying sufficient amperage to raise the temperature of the knife as high as 600° F., such temperature being sufficient for cutting cured rubber.

As is well known to those skilled in the art, the computerized numerical controller 64 is a hard-wired programmable machine in which relay contacts are used as a portion of the programming media. By following the teaching presented in "PAL USERS GUIDE, Series 7300," copyrighted in February, 1977, by Allen Bradley, Inc., one may readily program the numerical controller 64 to output appropriate control signals for controlling the five servo motors for the five axes of movement and the temprature relays 160–166 for selection of appropriate temperatures. The programmability of the controller 64 also provides for communication with system inputs via contact closures. The numerical controller 64 operates in standard fashion as used in lathing or milling operations to control movement along the five axes while selecting appropriate predetermined temperatures via the relays 160–166. For purposes of facilitating an understanding of the invention, the programs available with the structure of the preferred embodiment are presented directly below.

Figure 7:
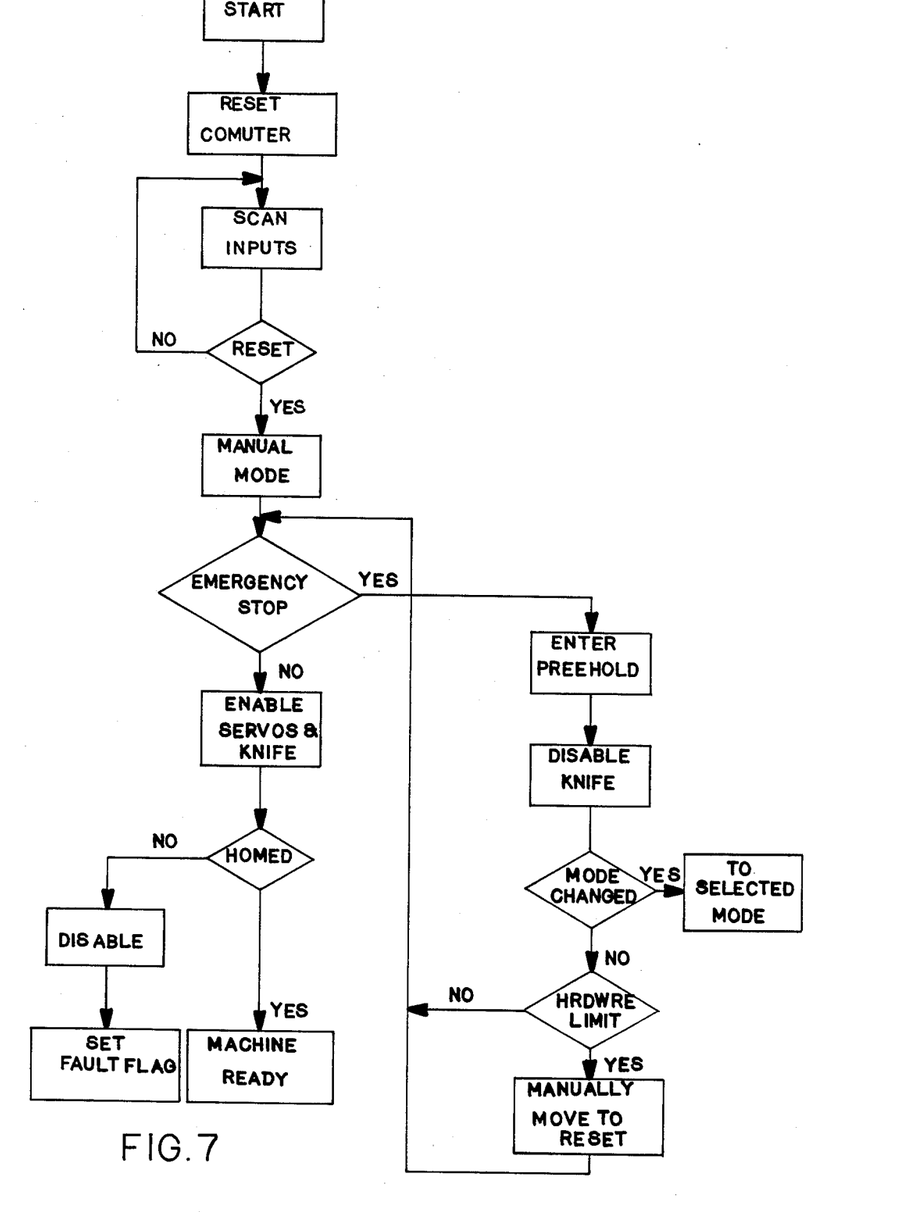
FIG. 7 is a program flow chart of the initialization technique of the numerical controller of the system.

As shown in FIG. 7, the technique of the invention includes a program having an initialization subroutine which, on cycle start, resets the computer and initializes the registers and other circuitry thereof. The inputs, such as from the keyboard or paper tape reader, are scanned until it is determined that the reset switch has been depressed. At this point in time, the numerical controller 64 enters into the manual mode of operation and a determination is made as to whether or not an emergency stop command has been given. The emergency stop may occur, for example, upon the sensing of a broken knife or the overrunning of system limits, as by tripping one of the end limit proximity switches. If the emergency stop has not been sensed, the five servo motors and the knife 54 are enabled. A determination is then made as to whether or not the system has been homed as determined by the home position proximity switches 76–84 discussed hereinabove. If the system has been homed, establishing a reference point for operation, the machine has been readied for the tire grooving operation or programming. If homing has not been achieved, all modes of operation of the controller 64 are disabled except for the manual mode, and a fault flag is set. At this point in time, the system may be jogged via the jog buttons of the control panel of the controller 64 or by means of the joy sticks discussed hereinabove until the home position proximity switches have been tripped. At this time, the initialization program of FIG. 7 can be restarted and the machine readied for operation.

Figure 8:
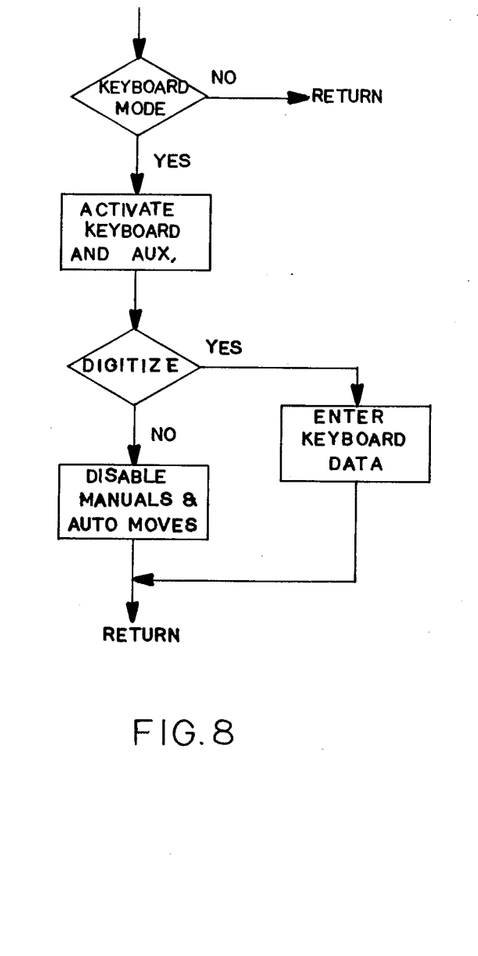
FIG. 8 is a program flow chart of the keyboard mode operation of the numerical controller of the system.

A first mode of operation is the keyboard mode, in which the keyboard may be used for entering data or for actually controlling operation of the controller 64. The keyboard is most typically used in writing, editing, or modifying programs. The flow chart of the keyboard mode routine first establishes whether or not the keyboard mode has been selected. If not, the system returns to the main program. If, however, the keyboard mode has been selected as by actuation of an appropriate switch, the keyboard is activated. At this point in time, programs can be written into memory using tne keyboard and all edits are active. The PAL programming techniques and functions may be used for entry via the keyboard and the paper tape input and outputs are activated. If the digitized mode, to be discussed hereinafter, has not been selected, all manual movements or automatic functions are disabled such that total control of the controller 12 is from the keyboard thereof. However, if the digitized mode has been selected as by an appropriate switch, data is entered and a program written via the keyboard. Such data and programming would include analytical positions, feed rates of the various axes, temperature, and the like. Comments may also be added with the program for appearance on the CRT when the program is run. In standard fashion, utilizing a computerized numerical controller, the information is typed via a keyboard and thence stored into memory by activation of a "digitize enter" push button. It should be appreciated that during the digitize mode all manual functions such as "jog" and the like are available for motion along the various axes, data respecting positional changes from one move to the next being digitized and entered for the program in a manner to be discussed directly hereinafter.

Figure 9:
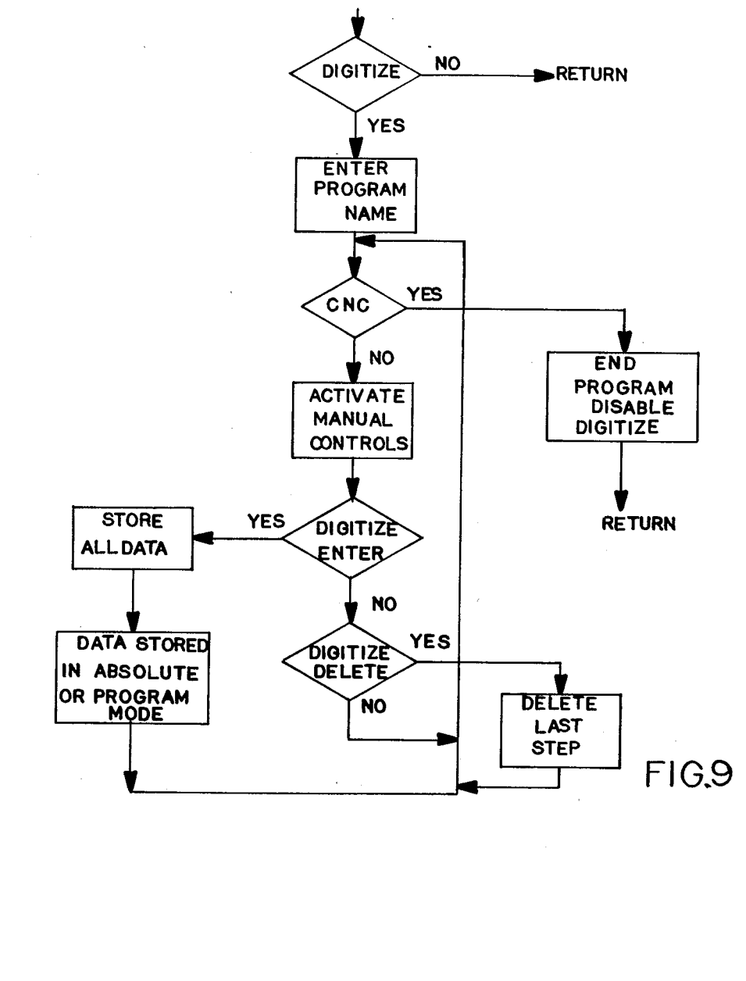
FIG. 9 is a program flow chart of the digitizing technique of the numerical controller for programming thereof.

In FIG. 9, the digitized mode of operation is shown. If the digitized selector switch has been actuated, the name of the program to be developed is entered via the keyboard and depression of the "transmit" key. During the entire digitize technique, the keyboard is actuated as discussed with respect to FIG. 8, to allow data and messages to be entered. If the digitize selector is in the "CNC" position (computerized numerical control), the program is ended and the digitizing techniques are terminated. If not, manual control such as the jog buttons, joy sticks, and rotational switches for the C axis are activated. If, for example, a tread design were to be traced on a tire carcass, the outline of a single tread may be placed on the carcass and the jog buttons and joy sticks actuated to trace along the tread outline. At particular points along the pattern being traced, the digitize enter push button would be depressed, storing all of the data relative to each of the five axes at that particular point. As the pattern is traced and successive points are digitized, a program is developed which will establish the coordinates for each of the five axes of the entire tread pattern. In other words, when the "digitize enter" push button is depressed, this signals the numerical controller that the position of the machine at this instance is to be stored in memory. This also includes information inputted through the keyboard. If the numerical controller is selected at that point in time to operate in the absolute programming mode, all machine movements would be basec upon the home position. However, if control is in the incremental programming mode, each machine movement is based upon the previous programmed step. It can be seen that the incremental programming mode would be used when creating a lug pattern which will be repeated around the tire. It will also be appreciated that the numerical controller includes the ability to mirror a pattern such that, if the lug patterns are symmetrical about the tire only the design of one lug on one side of the tire need be programmed in the incremental mode with that program comprising a subroutine to be followed about the entire circumference of the tire about one side thereof and then mirrored and repeated about the other side.

It will be appreciated that the coordinates of movement of the five axes in tracing a pattern may be digitized by themselves to establish a rough outline of the program to be followed. Then, that program may be followed in carving a groove in a tire with the operator regulating the temperature of the cutting knife to determine optimum cutting temperatures and feed rates. This information may then be entered via the keyboard in the digitizing mode to edit the program and to optimize the same. Again, such programming techniques would be readily perceivable to those skilled in the art having the benefit of applicant's teachings herein.

With further reference to FIG. 9, it can be seen that a "digitize delete" button is also provided which, if activated, deletes the last step entered in the program to allow the programmer to correct errors. If neither the digitize enter nor the digitize delete buttons have been depressed, the program merely loops as shown. Similarly, after the last step has been deleted, the program loops.

It should now be appreciated that an important facet of the invention is the ability to utilize a tire carcass or template and create a program while actually tracing a tread design on the carcass or template. Operating in the manual mode and jogging the various axes to achieve the desired points allows the coordinates to be digitized, while the keyboard allows selection of one of the five available temperatures at any particular point in the program. Similarly, feed rates may be entered via the keyboard. With this data, the controller 64 may then interpolate the concurrent movements of all five axes to achieve a smooth movement of the knife between digitized points. In any event, once the program has been written and named, it may be called up in any matter program designed for grooving a particular tire. When a plurality of identical lugs are to be formed, the program may be entered in the incremental mode for a single lug with that program being repetitively called up to form such lugs about one side of the tire and then, if desired, mirrored for carving the opposite side.

Figure 10:
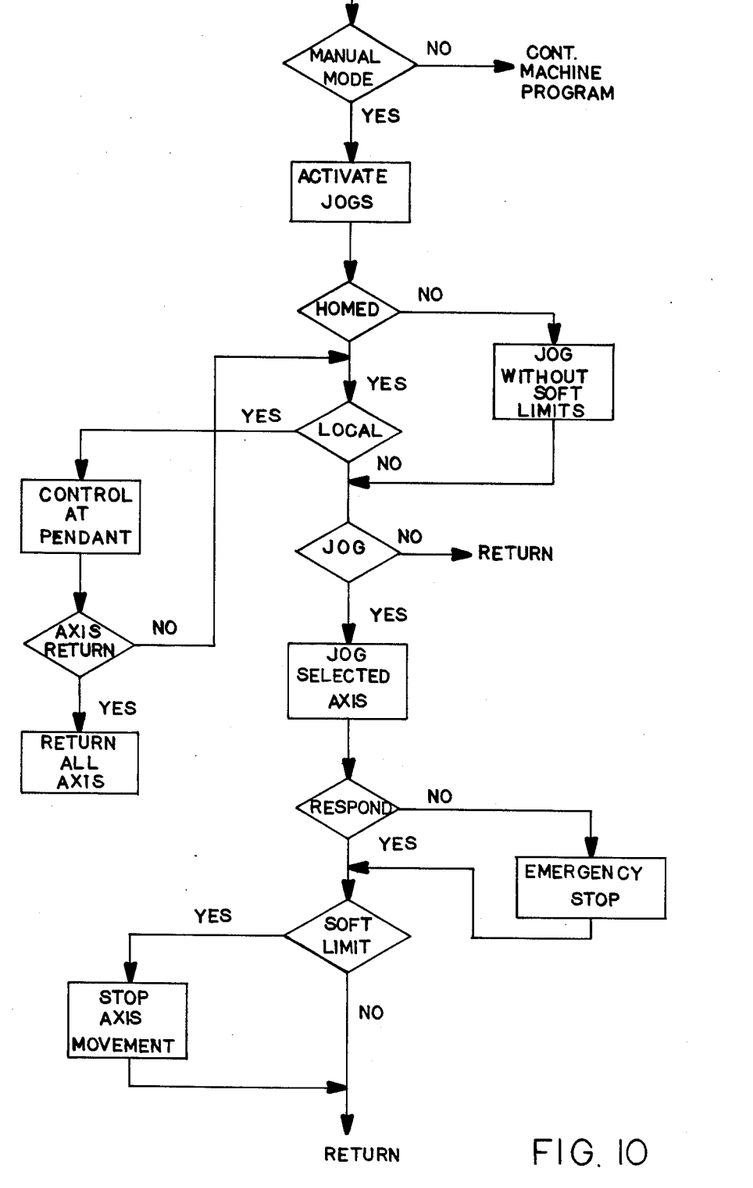
FIG. 10 is a program flow chart of operation of the numerical controller in the manual mode.

The manual mode of operation of the invention is illustrated in FIG. 10. If the manual mode has been selected, the keyboard, tape reader and punch, autocycle, and auto-temperature select are deactivated. Simultaneously, the incremental and continuous jogs for all axes are enabled. A determination is then made as to whether or not the axes have been homed. If the axes have not been homed, the axes controlled by the numerical controller 64 can still be jogged without any software limits Accordingly, only the hardware limits effected by the end limit proximity switches 76a–84a would be operative for terminating motion along each of the axes. Tripping of an end limit switch sets an emergency stop, placing the computerized numerical controller 64 in a feed hold condition and requiring that the system be manually moved or electrically jumpered to move out of the end limit condition.

If the axes have been homed, a determination is then made as to whether or not local operation is to be performed. If the appropriate switch has selected local operation, the manual functions available at the pendant station are activated. The axes jog push buttons and joy sticks are enabled with only a single axis being capable of movement at a time. These external jog buttons, paralleling those on the pushbutton keyboard of the controller, may then be used for digitizing a new program as discussed hereinabove. Similarly, the contacts of the temperature selection switch are also activated to enable the programmer to select one of the five available temperatures which are hardware-defined by the thumb wheel switches discussed above. This allows the programmer to enter information respecting temperatures as the program is developed. The pendant station also includes means for allowing the operator to return each of the five axes to the home position as shown. Control stays in the local mode of operation until switched to remote operation by the operator.

In remote operation, the computerized numerical controller allows for jogging of the various axes by means of selector switches and push buttons which comprise an integral part of the controller 64. If a jog command has been entered, the selected axis is jogged in the selected direction for a selected distance and at a selected rate, such direction, distance, and rate being switch-selectable. A determination is then made as to whether or not the drive of the selected axis has responded to the jog signal. If not, an emergency stop is entered, placing the controller in the feed hold posture until the operator resets the system. If any of the axes transgress the software limits, movement in the selected direction is terminated and the CRT displays the direction of the over limit. The axis can then be jogged in the opposite direction to correct the over limit condition and return is made to the program.

As seen from FIG. 10, the manual mode of operation allows the controller to jog each of the various axes and enter data respecting such jogging. This facilitates the development and editing of programs since it allows an operator to trace a desired lug or tread pattern along a template or across a stenciled tire carcass.

Figure 11:
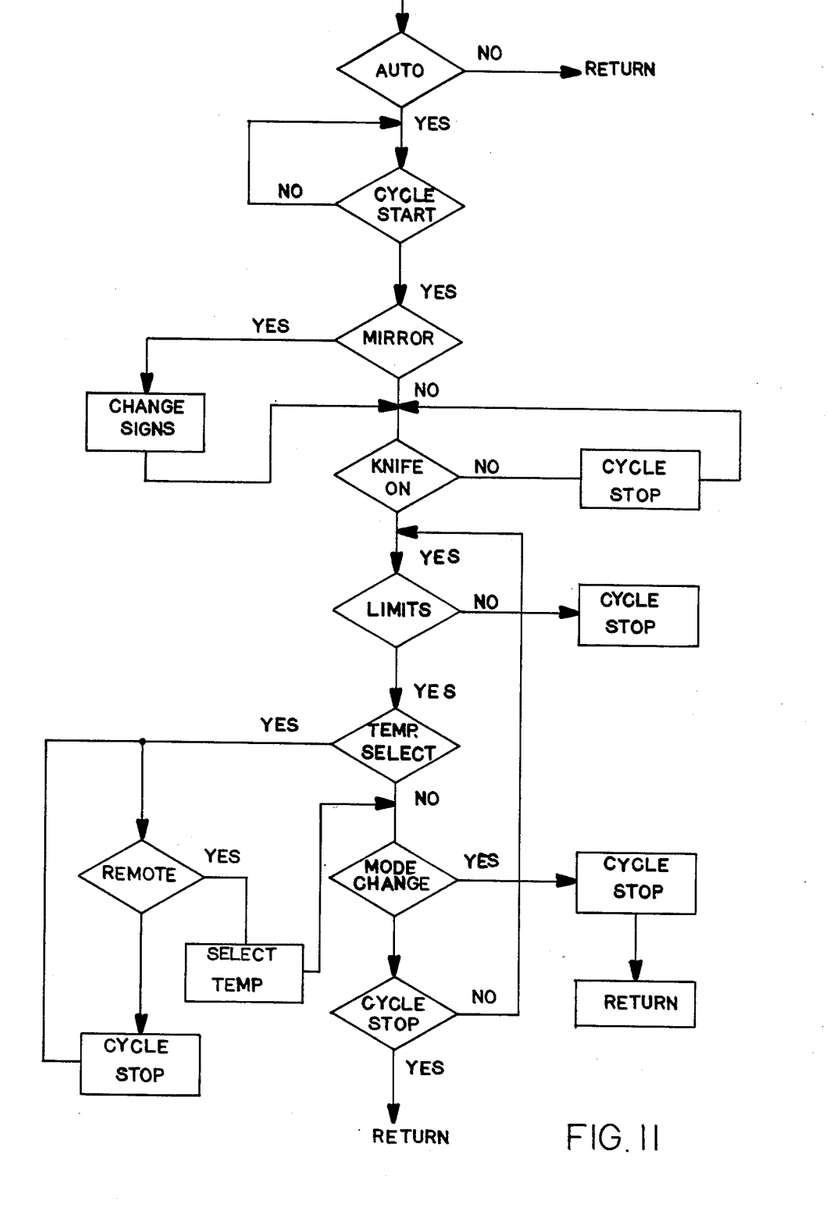
FIG. 11 is a program flow chart of the automatic cycle operation of the numeral controller.

With final attention to the flow charts of the programs for the computerized numerical controller 64, reference is made to FIG. 11. Here the automatic or auto mode of operation is shown. If the auto mode has been selected, the program loops until the cycle start button has been depressed. At that point in time, a determination is made as to whether or not the mirror image switches have been actuated. If so, the signs associated with the A, B, and Y axes are changed such that the mirror image of the programmed tread design may be cut on a second side of the tire as discussed above. Determination is also made as to whether or not the knife 54 has been turned on. If not, the cycle stop condition is entered until the operator actuates the hot knife assembly.

With the knife on, the program controls the assembly 10 to begin moving the various programmed axes and determinations are continuously made as to whether or not the moves in any particular axis exceed programmed limits. If the moves are not within the limits, a cycle stop is entered and the system must be reset. If the movements along the axes are within limits, the program determines whether or not a temperature has been selected. If a temperature has been selected and the system is in the remote operation mode, the knife temperature is set accordingly. If the local/remote switch is not in the remote position, a cycle stop is entered until the remote switch is actuated.

While in the automatic mode, the controller 64 determines whether or not the mode of operation has been changed. If it has, the controller 64 will conclude the step in which it is presently engaged and then enter a cycle stop and will remain there until the system is reset by the operator. Otherwise, the automatic mode continues to cycle until a programmed cycle stop is sensed, at which time the system returns to an idle condition awaiting the next command.

Thus, it can be seen that the objects of the invention have been satisfied by the structure and techniques presented hereinabove. The invention is shown as including means for controlling five axes of movement as well as feed rates and knife temperature during a tire grooving operation. The invention also includes means for tracing a tire pattern while digitizing such tracing to write or edit a program. While in accordance with the patent statutes only the best mode and preferred embodiment of the invention has been presented and described in detail, it will be understood that the invention is not limited thereto or thereby. Accordingly, reference should be had to the appended claims.

We claim:

1. Apparatus for cutting a tread design into a tire, comprising:
   first means for receiving and rotating said tire about the tire axis;
   a carriage in juxtaposition to said first means and movably maintained upon a first set of tracks parallel to the tire axis and a second set of tracks normal to the tire axis;
   a knife maintained upon said carriage, said knife being rotatable about a pair of intersecting orthogonal axes, said knife being heated by an electrical current control source, including a plurality of temperature selector means which, upon actuation, are operatively connected to a transformer which correspondingly applies electrical current to said knife; and
   programmed control means connected to said temperature selector means for selectively actuating certain of said temperature selection means for regulating the current to said knife during the cutting of the tread design to regulate temperature dependent upon the depth of cut, curvate nature of the cut, speed of cut, and state of cure of the tire.

2. The apparatus according to claim 1 wherein said first and second tracks and said pair of orthogonal axes each have associated therewith first switch means for producing an output signal when said carriage and knife are in initial predefined positions.

3. The apparatus according to claim 2 wherein said first and second tracks and said pair of orthogonal axes each have associated therewith second switch means for producing output signals when said carriage and knife exceed predefined limits of movement.

4. The apparatus according to claim 1 which further includes programmable control means operatively connected to said first means, carriage and knife for controlling relative movement therebetween.

5. The apparatus according to claim 4 which further includes servo motors connected to each of said first means, carriage, and knife, and controlled by said programmable control means for effecting rotational movement of the tire and said knife, and lateral movement of said carriage.

6. The apparatus according to claim 5 which further includes an encoder interconnected between each said servo motor and said programmable control means, said encoders presenting electrical data to said programmable control means indicative of instantaneous positional relationships of said knife to the tire.

7. The apparatus according to claim 6 wherein said knife is heated by electrical current passing therethrough, said current being supplied by current control means connected to and regulated by said programmable control means 8. The apparatus according to claim 7 wherein said current control means includes a plurality of temperature selection means for establishing and changing said current by selective actuation by said programmable control means.

9. The apparatus according to claim 8 wherein said selective actuation of said temperature selection means is effectuated by said programmable control means as a function of said instantaneous positional relationships.

10. The apparatus according to claim 4 which further includes means for manually effecting said relative movement and wherein said programmable control means includes means for sensing instantaneous positional relationships between said first means, carriage, and knife and for digitizing and storing data relative thereto.

11. The apparatus according to claim 10 wherein said programmable control means includes a keyboard allowing an operator to communicate commands and data thereto, said programmable control means generating a program from said data respecting positional relationships between said first means, carriage, and knife, and said data and commands from said keyboard.

12. The apparatus according to claim 1 wherein said first means comprises a rim, the tire being mounted and imflated upon said rim.

13. The apparatus according to claim 10 wherein said control means includes a keyboard allowing an operator to communicate commands and data thereto, said control means generating a program from said data respecting positional relationships between said first means, carriage, and knife, and said data and commands from said keyboard.

14. The method of forming grooves across the circumferential surface and sidewall of a tire, comprising:
   rotating a tire about an axis;
   laterally moving a carriage bearing a hot cutting knife in parallel and orthgonal directions with respect to said axis, bringing said knife into cutting engagement with said tire;
   rotatably moving said knife about a pair of intersecting orthogonal axes, said lateral and rotational movement of said knife effecting a groove across the tire from the sidewall and across the tread surface thereof; and
   regulating the temperature of said knife between preestablished temperature levels in accordance with said lateral and rotational movement of said knife and the rotation of said tire.

15. The method of claim 14 wherein the rate of lateral and rotational movement of said knife and the rotational movement of said tire are controlled with respect to each other.

16. The method of claim 14, further including recording data respecting each said lateral and rotational movement and developing therefrom a program for controlling such subsequent movements.

17. The method of claim 14 wherein all said lateral and rotational moves are conducted simultaneously.

18. The method of claim 14 further including the steps of inflating said tire.

19. The method of forming grooves across the circumferential surface and sidewall of a tire, comprising:
   rotating a tire about an axis;
   concurrently laterally moving a carriage bearing a hot cutting knife in parallel and orthgonal directions with respect to said axis, bringing said knife into cutting engagement with said tire;

concurrently rotatably moving said knife about a pair of orthogonal axes, said lateral and rotational movement of said knife effecting a groove across the tire from the sidewall and across the tread surface thereof; and wherein the temperature of said hot cutting knife is regulated in accordance with said lateral and rotational movement of said knife and the rotation of said tire.

* * * * *